US012335707B2

(12) United States Patent
Yan et al.

(10) Patent No.: US 12,335,707 B2
(45) Date of Patent: Jun. 17, 2025

(54) DOUBLE-SIDED SPEAKER DEVICE

(71) Applicant: AAC Microtech (Changzhou) Co., Ltd., Jiangsu (CN)

(72) Inventors: Xudong Yan, Changzhou (CN); Tao Shao, Changzhou (CN); Xiaojiang Gu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 260 days.

(21) Appl. No.: 18/330,329

(22) Filed: Jun. 6, 2023

(65) Prior Publication Data

US 2024/0179469 A1 May 30, 2024

Related U.S. Application Data

(63) Continuation of application No. PCT/CN2022/143973, filed on Dec. 30, 2022.

(30) Foreign Application Priority Data

Nov. 30, 2022 (CN) ........................ 202223196162.6

(51) Int. Cl.
*H04R 9/02* (2006.01)
*H04R 7/12* (2006.01)
(Continued)

(52) U.S. Cl.
CPC ............ *H04R 9/025* (2013.01); *H04R 7/127* (2013.01); *H04R 9/046* (2013.01); *H04R 9/06* (2013.01)

(58) Field of Classification Search
CPC .......... H04R 9/025; H04R 1/023; H04R 9/06; H04R 7/127; H04R 9/045; H04R 1/24; H04R 2400/11; H04R 9/066; H04R 7/16; H04R 1/2811; H04R 9/041; H04R 11/02; H04R 9/02; H04R 7/02; H04R 1/10; H04R 7/12; H04R 7/18; H04R 1/025;
(Continued)

(56) References Cited

U.S. PATENT DOCUMENTS 8,077,898 B2 * 12/2011 Huang ................ H04R 1/1016 381/345
2002/0094097 A1 * 7/2002 Sagren .................... H04R 1/24 381/186
(Continued)

*Primary Examiner* — Carolyn R Edwards
*Assistant Examiner* — Julie X Dang
(74) *Attorney, Agent, or Firm* — Wiersch Law Group

(57) ABSTRACT

A double-sided sound device includes a frame, a first vibration system, a second vibration system, and a magnetic circuit system. The frame includes an upper end opening and a lower end opening, the first vibration system is disposed at the upper end opening of the frame, the second vibration system is disposed at the lower end opening of the frame, and the magnetic circuit system is disposed in the frame. The magnetic circuit system includes an outer magnetic yoke, a magnet portion, and a non-magnetically conductive connector. The outer magnetic yoke includes a side wall and a first flange portion. The magnet portion includes an upper pole core, a lower pole core, and a magnetic steel, and the magnetic steel is clamped between the upper pole core and the lower pole core. The double-sided sound device reduces a product size, and further reduces material costs.

8 Claims, 3 Drawing Sheets

(51) Int. Cl.
*H04R 9/04* (2006.01)
*H04R 9/06* (2006.01)

(58) Field of Classification Search
CPC .............. H04R 25/606; H04R 2400/07; H04R 2460/13; H04R 1/1083; H04R 1/06; H04R 9/043; H04R 7/14; H04R 7/20; H04R 31/003; H04R 31/006; H04R 2499/11; G06T 7/90; G06T 5/92; G06T 11/001; G06T 5/60; G06T 7/11; G06T 2207/20081; G06T 2207/10024; G06T 2207/20084; G06V 10/56
USPC ................. 381/396, 177, 412, 423, 401–410
See application file for complete search history.

(56) References Cited

U.S. PATENT DOCUMENTS

| | | | | |
|---|---|---|---|---|
| 2004/0071309 | A1* | 4/2004 | Furuya | H04R 9/063<br>381/345 |
| 2005/0271226 | A1* | 12/2005 | Tanabu | H04R 9/063<br>381/396 |
| 2006/0120551 | A1* | 6/2006 | Enomoto | H04R 9/025<br>381/396 |
| 2021/0377668 | A1* | 12/2021 | Park | H04R 1/44 |
| 2022/0150642 | A1* | 5/2022 | Patsouras | H04R 31/006 |
| 2022/0210532 | A1* | 6/2022 | Han | H04R 9/063 |

* cited by examiner

A-A

DOUBLE-SIDED SPEAKER DEVICE

TECHNICAL FIELD

The present disclosure relates to a technical field of electroacoustic conversion, and in particular to a double-sided sound device.

BACKGROUND

Sound devices include single-sided sound devices and double-sided sound devices, and sound pressure levels of the double-sided sound devices far exceed sound pressure levels of the single-sided sound devices, so that the double-sided sound devices have more excellent acoustic performance.

Currently, the double-sided sound devices are generally to simply stack one single-sided sound device on a back surface of another one single-sided sound device, which result in an excessively large product volume of the double-sided sound devices. Moreover, the two single-sided sound devices which form one double-sided sound device each has own independent magnetic circuit system, high material costs are resulted.

Therefore, it is necessary to provide a new double-sided sound device to solve above technical problems.

SUMMARY

The present disclosure aims to solve above technical problems and provides a double-sided sound device capable of reducing product volumes and material costs.

In order to achieve above aims, the present disclosure provides a double-sided sound device, including a frame, a first vibration system, a second vibration system, and a magnetic circuit system. The frame includes an upper end opening and a lower end opening, the first vibration system is disposed at the upper end opening of the frame, the second vibration system is disposed at the lower end opening of the frame, and the magnetic circuit system is disposed in the frame. The first vibration system includes a first vibrating diaphragm and a first voice coil, and the first voice coil drives the first vibrating diaphragm to generate sound. The second vibration system includes a second vibrating diaphragm and a second voice coil, and the second voice coil drives the second vibrating diaphragm to generate sound. The magnetic circuit system includes an outer magnetic yoke, a magnet portion, and a non-magnetically conductive connector, the outer magnetic yoke is fixed to the frame, the magnet portion is disposed in the outer magnetic yoke, and the non-conductive non-magnetically conductive connector connects the outer magnetic yoke with the magnet portion. The outer magnetic yoke includes a side wall and a first flange portion, the side wall surrounds the magnet portion and the first flange portion extends from an upper end, close to the first vibrating diaphragm, of the side wall toward a direction close to the magnet portion. The magnet portion includes an upper pole core, a lower pole core, and a magnetic steel, the upper pole core is close to the first vibrating diaphragm, the lower pole core is close to the second vibrating diaphragm, and the magnetic steel is clamped between the upper pole core and the lower pole core. The non-magnetically conductive connector connects the first flange portion and the lower pole core, the first voice coil is inserted between the non-magnetically conductive connector and the magnet portion, and the second voice coil is inserted between the non-magnetically conductive connector and the side wall.

Furthermore, the non-magnetically conductive connector is a plastic connector.

Furthermore, the non-magnetically conductive connector is injection molded with the outer magnetic yoke and the lower pole core.

Furthermore, the frame includes an outer peripheral wall, an inner peripheral wall, and connecting beams, the inner peripheral wall is spaced apart from the outer peripheral wall, and the connecting beams connect the outer peripheral wall and the inner peripheral wall. The inner peripheral wall surrounds the side wall of the outer magnetic yoke, the first vibrating diaphragm is fixed to an upper end of the outer peripheral wall, and the second vibrating diaphragm is fixed to a lower end of the outer peripheral wall.

Furthermore, the first vibrating diaphragm includes a first dome, a first folding ring, and first supporting legs. The first folding ring surrounds the first dome, the first supporting legs extend from the first dome toward a direction of the second vibrating diaphragm, and each of the first supporting legs extends between adjacent two of the connecting beams. The second vibrating diaphragm includes a second dome, a second folding ring, and second supporting legs. The second folding ring surrounds the second dome, the second supporting legs extend from the second dome toward a direction of the first vibrating diaphragm, and each of the second supporting legs extends between adjacent two of the connecting beams. The first supporting legs and the second supporting legs are disposed in a staggered manner. The first vibration system further includes first centering support pieces, the first centering support pieces connect the outer peripheral wall and the first supporting legs, and each of the first centering support pieces is disposed between adjacent two of the connecting beams. The second vibration system further includes second centering support pieces, the second centering support pieces connect the outer peripheral wall and the second supporting legs, and each of the second centering support pieces is disposed between adjacent two of the connecting beams.

Furthermore, the outer magnetic yoke further includes a second flange portion, the second flange portion extends from a lower end, close to the second vibrating diaphragm, of the side wall toward a direction distal from the magnet portion, and the inner peripheral wall abuts against the second flange portion.

Furthermore, a shape and a size of the first vibrating diaphragm are the same as a shape and a size of the second vibrating diaphragm.

According to the double-sided sound device, the first vibration system and the second vibration system share the magnetic circuit system, which is compact in structure. Moreover, the magnetic circuit system may only require one magnetic steel, which reduces product volumes and material costs.

BRIEF DESCRIPTION OF DRAWINGS

In order to more clearly illustrate technical solutions in embodiments of the present disclosure, accompanying drawings that need to be used in the description of the embodiments are briefly described below, and it is obvious that the accompanying drawings in the following description are merely some embodiments of the present disclosure.

DETAILED DESCRIPTION

Technical solutions in embodiments of the present disclosure are clearly and completely described below with reference to accompanying drawings in the embodiments of the present disclosure. Obviously, the described embodiments are only a part of the embodiments of the present disclosure, but are not all embodiments. All other embodiments obtained by a person skilled in the art based on the embodiments of the present disclosure without creative efforts shall fall within protection scopes of the present disclosure.

Figure 1:
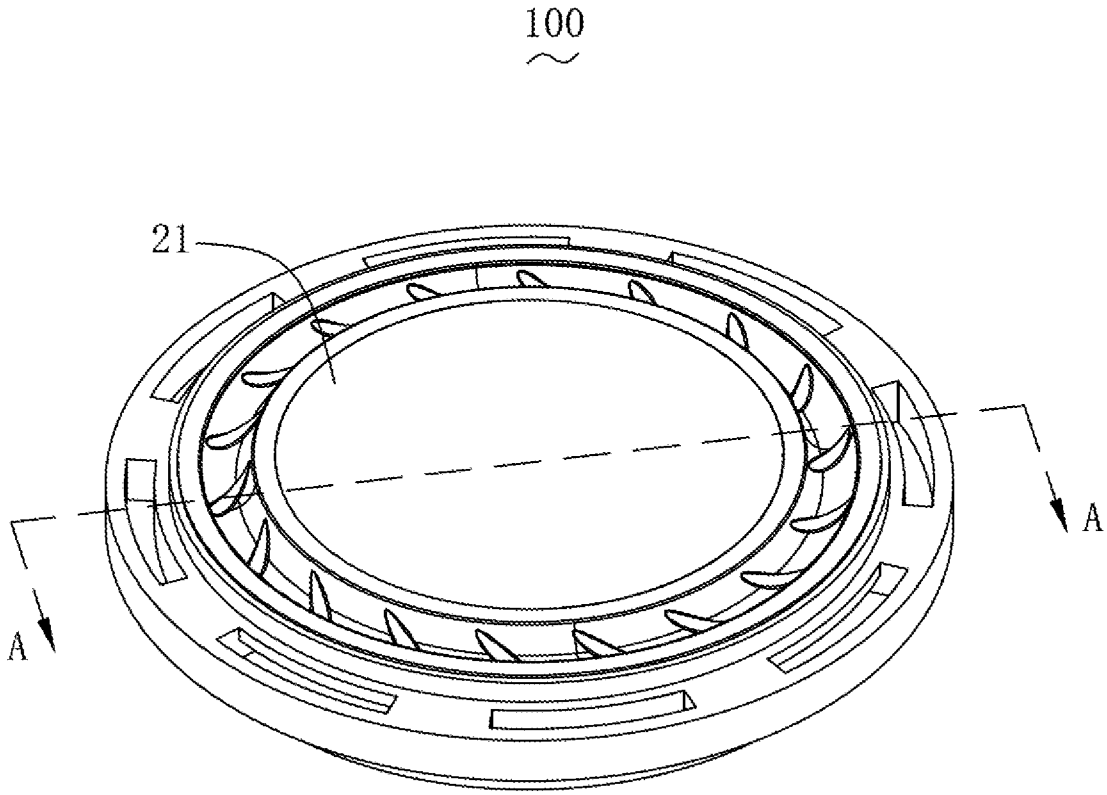
FIG. 1 is a three-dimensional schematic diagram of a double-sided sound device of the present disclosure.
Figure 2:
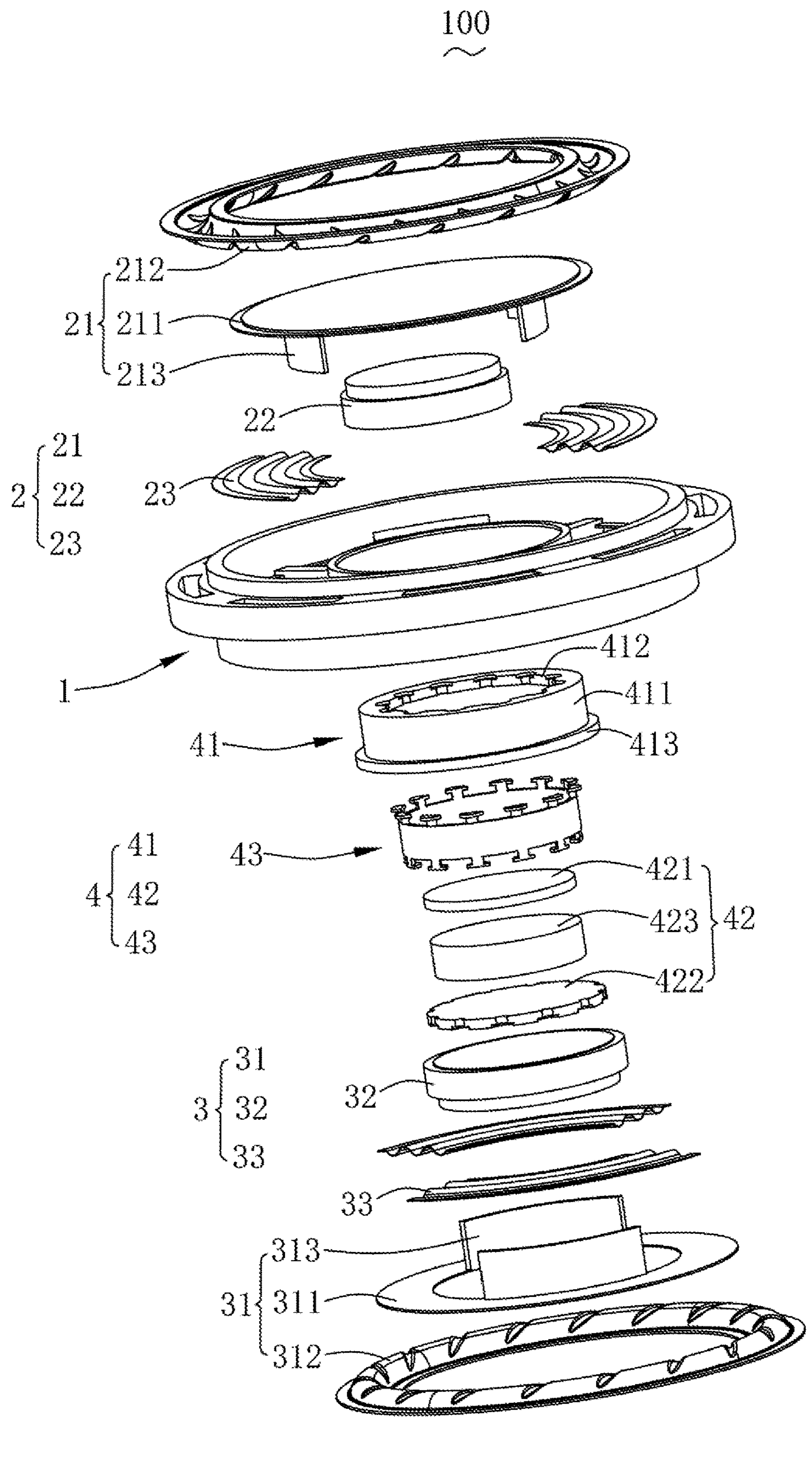
FIG. 2 is a three-dimensional schematic diagram of an exploded view of the double-sided sound device shown in FIG. 1.
Figure 3:
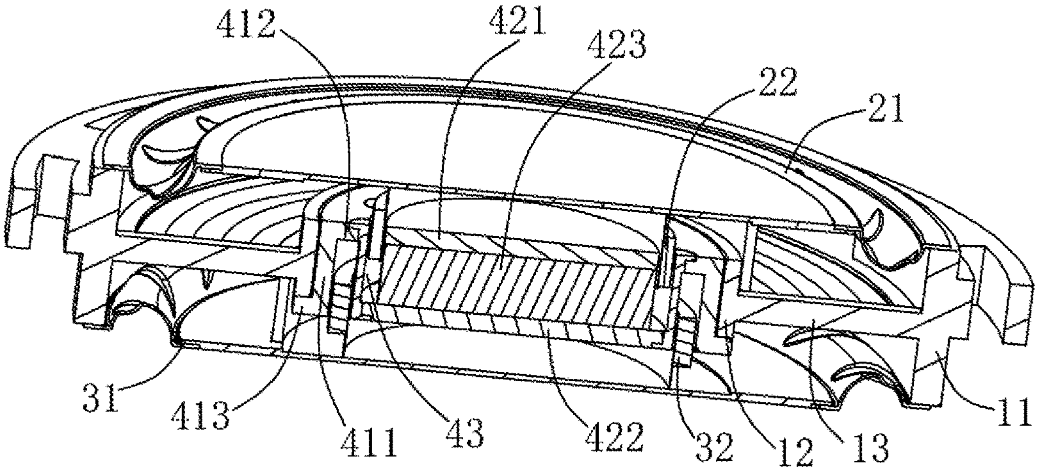
FIG. 3 is a schematic diagram of a cross-sectional view taken along the line A-A shown in FIG. 1.
Figure 4:
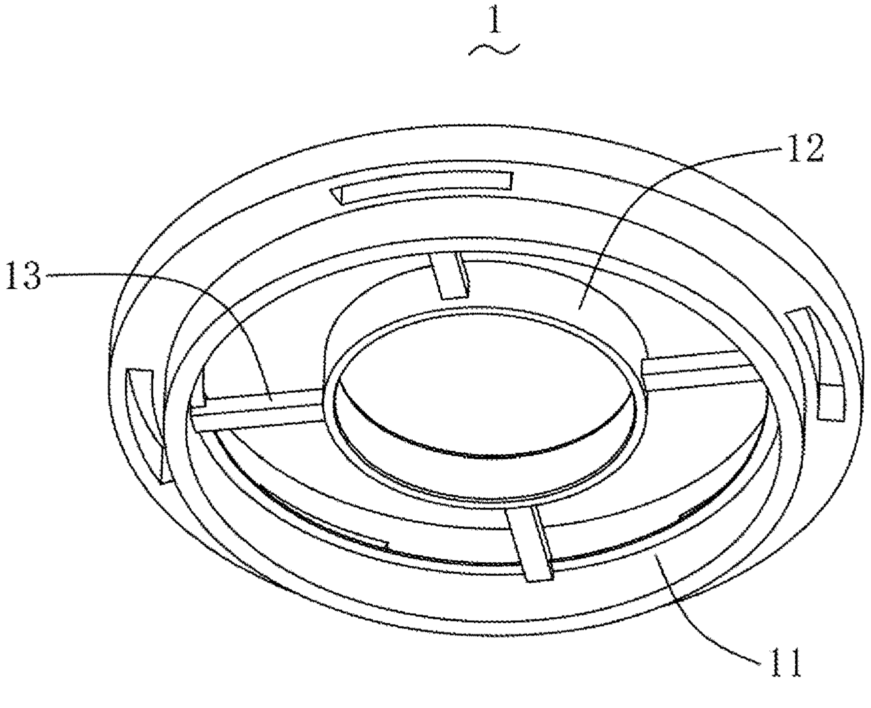
FIG. 4 is a three-dimensional schematic diagram of a frame of the double-sided sound device of the present disclosure.

Please refer to FIGS. 1-4, the present disclosure provides a double-sided sound device 100, including a frame 1, a first vibration system 2, a second vibration system 3, and a magnetic circuit system 4. The frame 1 includes an upper end opening and a lower end opening, the first vibration system 2 is disposed at the upper end opening of the frame 1, the second vibration system 3 is disposed at the lower end opening of the frame 1, and the magnetic circuit system 4 is disposed in the frame 1.

The first vibration system 2 includes a first vibrating diaphragm 21 and a first voice coil 22, and the first voice coil 22 drives the first vibrating diaphragm 21 to generate sound. The second vibration system 3 includes a second vibrating diaphragm 31 and a second voice coil 32, and the second voice coil 32 drives the second vibrating diaphragm 31 to generate sound. Preferably, a shape and a size of the first vibrating diaphragm 21 are the same as a shape and a size of the second vibrating diaphragm 31.

The magnetic circuit system 4 includes an outer magnetic yoke 41, a magnet portion 42, and a non-magnetically conductive connector 43, the outer magnetic yoke 41 is fixed to the frame 1, the magnet portion 42 is disposed in the outer magnetic yoke 41, and the non-conductive non-magnetically conductive connector 43 connects the outer magnetic yoke 41 with the magnet portion 42. The outer magnetic yoke 41 includes a side wall 411 and a first flange portion 412, the side wall 411 surrounds the magnet portion 42 and the first flange portion 412 extends from an upper end, close to the first vibrating diaphragm 21, of the side wall 411 toward a direction close to the magnet portion 42. The magnet portion 42 includes an upper pole core 421, a lower pole core 422, and a magnetic steel 423, the upper pole core 421 is close to the first vibrating diaphragm 21, the lower pole core 422 is close to the second vibrating diaphragm 31, and the magnetic steel 423 is clamped between the upper pole core 421 and the lower pole core 422. The non-magnetically conductive connector 43 connects the first flange portion 412 and the lower pole core 422, the first voice coil 22 is inserted between the non-magnetically conductive connector 43 and the magnet portion 42, and the second voice coil 32 is inserted between the non-magnetically conductive connector 43 and the side wall 411.

The non-magnetically conductive connector 43 is preferably a plastic connector, which is convenient for the non-magnetically conductive connector 43 to be injection molded with the outer magnetic yoke 41 and the lower pole core 422.

The frame 1 includes an outer peripheral wall 11, an inner peripheral wall 12, and connecting beams 13, the inner peripheral wall 12 is spaced apart from the outer peripheral wall 11, and the connecting beams 13 connect the outer peripheral wall 11 and the inner peripheral wall 12. The inner peripheral wall 12 surrounds the side wall 411 of the outer magnetic yoke 41, the first vibrating diaphragm 21 is fixed to an upper end of the outer peripheral wall 11, and the second vibrating diaphragm 31 is fixed to a lower end of the outer peripheral wall 11.

The first vibrating diaphragm 21 includes a first dome 211, a first folding ring 212, and first supporting legs 213. The first folding ring 212 surrounds the first dome 211, the first supporting legs 213 extend from the first dome 211 toward a direction of the second vibrating diaphragm 31, and each of the first supporting legs 213 extends between adjacent two of the connecting beams 13.

The second vibrating diaphragm 31 includes a second dome 311, a second folding ring 312, and second supporting legs 313. The second folding ring 312 surrounds the second dome 311, the second supporting legs 313 extend from the second dome 311 toward a direction of the first vibrating diaphragm 21, and each of the second supporting legs 313 extends between adjacent two of the connecting beams 13.

The first supporting legs 213 and the second supporting legs 313 are disposed in a staggered manner.

The first vibration system 2 further includes first centering support pieces 23, the first centering support pieces 23 connect the outer peripheral wall 11 and the first supporting legs 213, and each of the first centering support pieces 23 is disposed between adjacent two of the connecting beams 13. The second vibration system 3 further includes second centering support pieces 33, the second centering support pieces 33 connect the outer peripheral wall 11 and the second supporting legs 313, and each of the second centering support pieces 33 is disposed between adjacent two of the connecting beams 13.

The outer magnetic yoke 41 further includes a second flange portion 413, the second flange portion 414 extends from a lower end, close to the second vibrating diaphragm 31, of the side wall 411 toward a direction distal from the magnet portion 42, and the inner peripheral wall 12 abuts against the second flange portion 413.

According to the double-sided sound device, the first vibration system and the second vibration system share the magnetic circuit system, which is compact in structure. Moreover, the magnetic circuit system may only require one magnetic steel, which reduces product volumes and material costs.

Above-mentioned embodiments are merely embodiments of the present disclosure, and it should be noted that, for a person skilled in the art of the present disclosure, improvements may be made without departing from the concept of the present disclosure, but these are all within the scope of protection of the present disclosure.

What is claimed is:

1. A double-sided sound device, comprising:

a frame;

a first vibration system;

a second vibration system; and a magnetic circuit system;

wherein the frame comprises an upper end opening and a lower end opening, the first vibration system is disposed at the upper end opening of the frame, the second vibration system is disposed at the lower end opening of the frame, and the magnetic circuit system is disposed in the frame; the first vibration system comprises a first vibrating diaphragm and a first voice coil, and the first voice coil drives the first vibrating diaphragm to generate sound; the second vibration system comprises a second vibrating diaphragm and a second voice coil, and the second voice coil drives the second vibrating diaphragm to generate sound; the magnetic circuit system comprises an outer magnetic yoke, a magnet portion, and a non-magnetically conductive connector, the outer magnetic yoke is fixed to the frame, the magnet portion is disposed in the outer magnetic yoke, and the non-conductive non-magnetically conductive connector connects the outer magnetic yoke with the magnet portion; the outer magnetic yoke comprises a side wall and a first flange portion, the side wall surrounds the magnet portion and the first flange portion extends from an upper end, close to the first vibrating diaphragm, of the side wall toward a direction close to the magnet portion; the magnet portion comprises an upper pole core, a lower pole core, and a magnetic steel, the upper pole core is close to the first vibrating diaphragm, the lower pole core is close to the second vibrating diaphragm, and the magnetic steel is clamped between the upper pole core and the lower pole core; the non-magnetically conductive connector connects the first flange portion and the lower pole core, the first voice coil is inserted between the non-magnetically conductive connector and the magnet portion, and the second voice coil is inserted between the non-magnetically conductive connector and the side wall.

2. The double-sided sound device according to claim 1, wherein the non-magnetically conductive connector is a plastic connector.

3. The double-sided sound device according to claim 2, wherein the non-magnetically conductive connector is injection molded with the outer magnetic yoke and the lower pole core.

4. The double-sided sound device according to claim 1, wherein the frame comprises an outer peripheral wall, an inner peripheral wall, and connecting beams, the inner peripheral wall is spaced apart from the outer peripheral wall, and the connecting beams connect the outer peripheral wall and the inner peripheral wall; the inner peripheral wall surrounds the side wall of the outer magnetic yoke, the first vibrating diaphragm is fixed to an upper end of the outer peripheral wall, and the second vibrating diaphragm is fixed to a lower end of the outer peripheral wall.

5. The double-sided sound device according to claim 4, wherein the first vibrating diaphragm comprises a first dome, a first folding ring, and first supporting legs; the first folding ring surrounds the first dome, the first supporting legs extend from the first dome toward a direction of the second vibrating diaphragm, and each of the first supporting legs extends between adjacent two of the connecting beams; the second vibrating diaphragm comprises a second dome, a second folding ring, and second supporting legs; the second folding ring surrounds the second dome, the second supporting legs extend from the second dome toward a direction of the first vibrating diaphragm, and each of the second supporting legs extends between adjacent two of the connecting beams; the first supporting legs and the second supporting legs are disposed in a staggered manner; the first vibration system further comprises first centering support pieces, the first centering support pieces connect the outer peripheral wall and the first supporting legs, and each of the first centering support pieces is disposed between adjacent two of the connecting beams; the second vibration system further comprises second centering support pieces, the second centering support pieces connect the outer peripheral wall and the second supporting legs, and each of the second centering support pieces is disposed between adjacent two of the connecting beams.

6. The double-sided sound device according to claim 4, wherein the outer magnetic yoke further comprises a second flange portion, the second flange portion extends from a lower end, close to the second vibrating diaphragm, of the side wall toward a direction distal from the magnet portion, and the inner peripheral wall abuts against the second flange portion.

7. The double-sided sound device according to claim 1, wherein the non-magnetically conductive connectors are stainless steel connectors.

8. The double-sided sound device according to claim 1, wherein a shape and a size of the first vibrating diaphragm are the same as a shape and a size of the second vibrating diaphragm.

* * * * *